United States Patent
Fraser

(10) Patent No.: US 10,316,740 B2
(45) Date of Patent: Jun. 11, 2019

(54) SYSTEMS INCLUDING AN ELECTRICALLY ASSISTED TURBOCHARGER AND METHODS OF USING THE SAME

(71) Applicant: BorgWarner Inc., Auburn Hills, MI (US)

(72) Inventor: Brock Sterling Fraser, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/433,376

(22) Filed: Feb. 15, 2017

(65) Prior Publication Data

US 2018/0230898 A1    Aug. 16, 2018

(51) Int. Cl.
| | |
|---|---|
| F02B 37/10 | (2006.01) |
| F02B 37/12 | (2006.01) |
| F02B 37/14 | (2006.01) |
| F02B 37/16 | (2006.01) |
| F02B 39/10 | (2006.01) |

(52) U.S. Cl.
CPC ............ F02B 37/168 (2013.01); F02B 37/10 (2013.01); F02B 37/14 (2013.01); F02B 37/166 (2013.01); F02B 39/10 (2013.01); *F02B 2037/125* (2013.01); *Y02T 10/144* (2013.01)

(58) Field of Classification Search
CPC .. F02B 37/168; F02B 37/10; F02B 2037/125; F02B 13/00
See application file for complete search history.

(56) References Cited

U.S. PATENT DOCUMENTS

| | | | | |
|---|---|---|---|---|
| 2,585,029 A | * | 2/1952 | Nettel ................. | F02B 37/11 192/3.57 |
| 2,608,051 A | * | 8/1952 | Nettel ................. | F02B 37/11 60/605.1 |
| 2,633,698 A | * | 4/1953 | Nettel ................. | F02B 29/0406 123/27 R |
| 3,163,984 A | * | 1/1965 | Dumont ............. | F01N 3/32 60/290 |
| 3,513,929 A | * | 5/1970 | Kim .................... | F02B 37/166 123/1 A |

(Continued)

FOREIGN PATENT DOCUMENTS

| | | |
|---|---|---|
| DE | 10139526 A1 | 2/2003 |
| JP | 2005016464 A | 1/2005 |

(Continued)

OTHER PUBLICATIONS

International Search Report and Written Opinion; dated Apr. 19, 2018; for International Application No. PCT/US2018/017953; 12 pages.

*Primary Examiner* — J. Todd Newton
(74) *Attorney, Agent, or Firm* — BrooksGroup

(57) ABSTRACT

A product comprising a turbocharger comprising a turbine operatively connected to a compressor, an exhaust conduit connected to an inlet of the turbine, a bleed path connected to an outlet of the compressor, the bleed path comprising at least one of an open end to discharge compressor air to the atmosphere or an end connected to the exhaust conduit up stream of the turbine constructed and arranged to flow air from the compressor into the turbine.

7 Claims, 2 Drawing Sheets

(56) References Cited

U.S. PATENT DOCUMENTS

| | | | | |
|---|---|---|---|---|
| 3,676,999 | A * | 7/1972 | Oldfield | F02B 37/166 |
| | | | | 123/559.1 |
| 3,961,199 | A * | 6/1976 | Bronicki | F02B 37/005 |
| | | | | 123/179.14 |
| 3,963,367 | A * | 6/1976 | Stalker | F04D 27/02 |
| | | | | 415/1 |
| 3,988,894 | A * | 11/1976 | Melchior | F02B 37/04 |
| | | | | 60/606 |
| 4,160,365 | A * | 7/1979 | Petrov | F02B 37/166 |
| | | | | 60/606 |
| 4,233,815 | A * | 11/1980 | Melchior | F02B 37/013 |
| | | | | 60/606 |
| 4,464,901 | A * | 8/1984 | Kobayashi | F02B 37/166 |
| | | | | 60/606 |
| 4,517,802 | A * | 5/1985 | Kobayashi | F02B 37/166 |
| | | | | 60/606 |
| 4,581,900 | A * | 4/1986 | Lowe | F04D 27/001 |
| | | | | 415/17 |
| 4,894,991 | A * | 1/1990 | Kawamura | F02B 37/10 |
| | | | | 60/608 |
| 5,029,442 | A * | 7/1991 | Nishiyama | F01N 5/02 |
| | | | | 122/20 B |
| 5,724,813 | A * | 3/1998 | Fenelon | F02B 37/10 |
| | | | | 60/606 |
| 5,743,715 | A * | 4/1998 | Staroselsky | F04D 27/02 |
| | | | | 415/1 |
| 5,746,062 | A * | 5/1998 | Beaverson | F04D 27/001 |
| | | | | 62/129 |
| 6,354,806 | B1 * | 3/2002 | Bingham, Jr. | F04D 27/001 |
| | | | | 340/945 |
| 6,434,940 | B1 * | 8/2002 | Araujo | F02B 33/34 |
| | | | | 123/565 |
| 6,449,950 | B1 | 9/2002 | Allen et al. | |
| 6,450,156 | B1 * | 9/2002 | Araujo | F02B 39/08 |
| | | | | 123/565 |
| 6,845,617 | B1 | 1/2005 | Allen et al. | |
| 6,871,498 | B1 * | 3/2005 | Allen | F02B 37/12 |
| | | | | 60/608 |
| 7,094,019 | B1 * | 8/2006 | Shapiro | F04D 27/0284 |
| | | | | 415/17 |
| 7,383,684 | B2 * | 6/2008 | Vuk | B60K 6/24 |
| | | | | 60/597 |
| 7,779,634 | B2 * | 8/2010 | Barthelet | F02B 37/04 |
| | | | | 60/600 |
| 7,793,500 | B2 | 9/2010 | Igarashi | |
| 9,328,949 | B2 * | 5/2016 | Blaiklock | F04D 27/001 |
| 2004/0093867 | A1 * | 5/2004 | Masuda | F02B 37/10 |
| | | | | 60/608 |
| 2006/0196182 | A1 * | 9/2006 | Kimoto | F02B 33/44 |
| | | | | 60/605.1 |
| 2006/0260304 | A1 * | 11/2006 | Ishiwatari | F02B 37/10 |
| | | | | 60/599 |
| 2008/0282699 | A1 * | 11/2008 | Barthelet | F02B 37/04 |
| | | | | 60/608 |
| 2009/0198432 | A1 * | 8/2009 | Tabata | F02D 23/02 |
| | | | | 701/103 |
| 2010/0242900 | A1 * | 9/2010 | Hitomi | F02D 13/0238 |
| | | | | 123/299 |
| 2010/0296914 | A1 * | 11/2010 | Staroselsky | F04D 27/001 |
| | | | | 415/47 |
| 2011/0146274 | A1 * | 6/2011 | Shimizu | B01D 46/0005 |
| | | | | 60/611 |
| 2012/0014812 | A1 * | 1/2012 | Blaiklock | F04D 27/001 |
| | | | | 417/26 |
| 2012/0183385 | A1 * | 7/2012 | Narayanan | F04D 27/0223 |
| | | | | 415/1 |
| 2015/0362237 | A1 * | 12/2015 | Clanin | F25B 49/022 |
| | | | | 62/115 |
| 2017/0016402 | A1 * | 1/2017 | Myung | F02D 9/02 |
| 2017/0074276 | A1 * | 3/2017 | Dahinten | F04D 27/02 |

FOREIGN PATENT DOCUMENTS

| | | |
|---|---|---|
| WO | 2004104390 A1 | 12/2004 |
| WO | 2006022635 A1 | 3/2006 |
| WO | 2014117006 A1 | 7/2014 |

* cited by examiner

SYSTEMS INCLUDING AN ELECTRICALLY ASSISTED TURBOCHARGER AND METHODS OF USING THE SAME

TECHNICAL FIELD

The field to which the disclosure generally relates to includes electrically assisted turbocharger systems and methods of using the same.

BACKGROUND

Vehicles may include a turbocharger. Turbochargers typically have a turbine for harnessing power from exhaust gas discharging from an engine, and a compressor tied mechanically and/or electrically to the turbine to use the power harnessed by the turbine directly or indirectly, and immediately or at a later time. Compressor maps may be based on compressor rig test results or predicted by a special computer program. Alternatively, the map of a similar compressor can be suitably scaled. The surge region, located on the left-hand side of the compressor map (known as the surge line), is an area of flow instability typically caused by compressor inducer stall. When turbochargers operate in surge for long periods of time, bearing failures may occur. When referencing a compressor map, the surge line is the line bordering the islands on the far left side of the map. Compressor surge is when the air pressure after the compressor is actually higher than what the compressor itself can physically maintain. This condition causes the airflow in the compressor wheel to back up, build pressure, and sometimes stall. In cases of extreme surge, the thrust bearings of the turbo can be destroyed, and will sometimes even lead to mechanical failure of the compressor wheel itself. When the compressor is in surge, the compressor is unstable. It is desirable to operate the compressor in a stable region to the right of the surge line. In some circumstances a surge control line may be utilized as an operating limitation for the compressor. A control surge line is typically a line parallel to the surge line and offset to the right of the surge line a margin, for example, 3-10% of the inlet volume flow at surge. In some circumstances, it may be desirable to operate a compressor at or to the right of the surge control line on a compressor map.

SUMMARY OF ILLUSTRATIVE VARIATIONS

A number of variations may include a product comprising an electrically assisted turbocharger comprising a turbine operatively connected to a compressor by a shaft and an electric motor connected to the compressor to assist in driving the compressor, an exhaust conduit connected to an inlet of the turbine, a bleed path connected to an outlet of the compressor, the bleed path having an end connected to the exhaust conduit up stream of the turbine constructed and arranged to flow air from the compressor into the turbine.

Illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
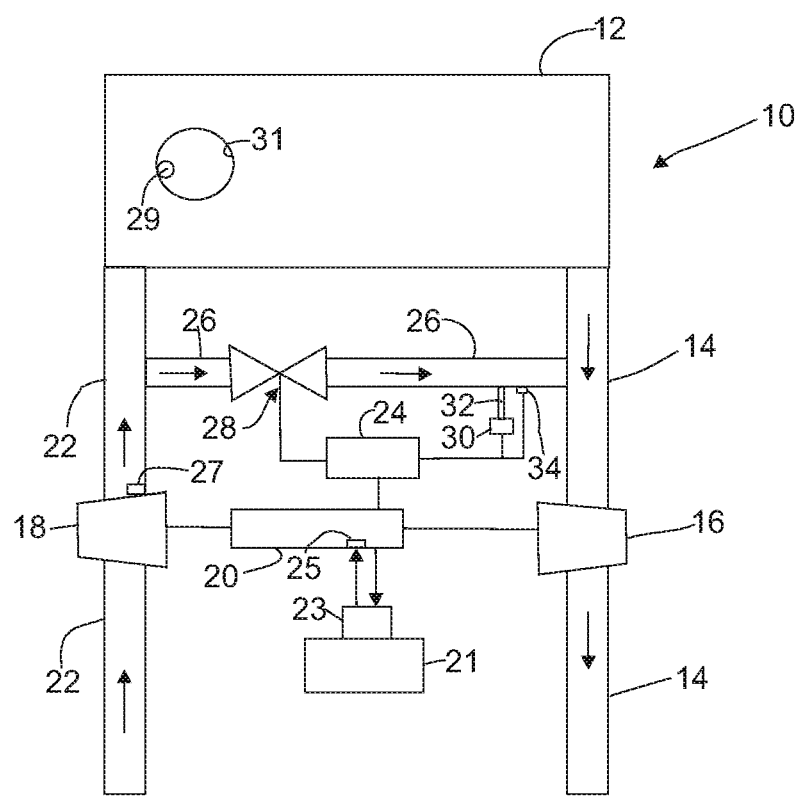
FIG. 1 illustrates a system including an electrically assisted turbocharger according to a number of variations.

Referring now to FIG. 1, in a number of a variations a system 10 may be provided which may include an engine 12 producing exhaust that exits the engine 12 through exhaust conduit 14. A portion of the exhaust conduit 14 is connected to the engine and to a turbine 16 to flow exhaust gas into the turbine 16. A portion of the exhaust conduit 14 may be connected to an outlet of the turbine 16 and may have an open end to discharge gas from the turbine 16 to the atmosphere. The turbine 16 may be mechanically connected to a compressor 16, a motor/generator 20 for producing electricity to be used directly to drive the compressor 18 or to be stored in a battery 21. A controller 23 may be associated with the battery 21 and/or the motor/generator 20 to control the amount of power stored in the battery 21 or delivered from the battery 21 to drive the motor 20 and the compressor 18. Alternatively, a control module 24 may be connected to the motor/generator 20 and other components including the battery 21 to control the storage and delivery of power from the battery 21. In a number of variations, an electric generator and an electric motor may be provided as separate devices. In a number of variations, an electric motor or may be geared to a shaft connecting the compressor and the turbine, geared to a wheel of the compressor, magnetics may be provided on a shaft connected to the compressor or on the compressor wheel so that the motor rotates the compressor. An air intake conduit 22 may be provided. A portion of the air intake conduit 22 may have an open end to take in air from the atmosphere and another end connected to the inlet of the compressor 18 to deliver air thereto. Another portion of the air intake conduit 22 may be connected at one end to the outlet of the compressor 18 and the other end connected to the engine 12 to deliver air thereto.

A bleed path (conduit) 26 may be operatively connected to the compressor 18 to allow some or all of the air delivered from the compressor 18 to not go directly into the engine 12. In a number of variations, a portion of the bleed path 26 may be connected to the outlet of the compressor 18 and to the exhaust conduit 14 upstream of the turbine 16. A valve 28 may be operatively positioned in the bleed path 26 to control air flow therethrough. The valve 28 may be actuated electrically, by air or hydraulic methods and may be connected to the controller 24 for rapid control and movement.

In a number of variations, the valve 28 may be a constructed and arranged to allow the discharge of compressor air to flow into the exhaust conduit 14. The controller 24 may also be connected to the valve 26 to quickly control the movement thereof. In a number of variations, a fuel storage container 30 may be provided with fuel therein and operatively connected to the compressor bleed path 26 to inject fuel into the bleed path 26. An igniter 34 may be operatively connected to ignite the fuel in the bleed path 26 to increase the flow of gas through the turbine 16 as desired.

A compressor bleed path (conduit) 26 may be utilized to avoid compressor surge. Compressor surge may occur even at low engine speeds. When an electric motor is used to drive the compressor or is used to assist driving a compressor mechanically connected to a turbine electric power is used to rapidly turn up the motor and the compressor which may result in compressor surge without the presence of a compressor bleed path 26. When the compressor bleed path 26 is connected to the exhaust conduit 14 upstream of the turbine 16, pressure and flow through the turbine 16 can rapidly rise and result in a rapid rise in engine torque.

Figure 2:
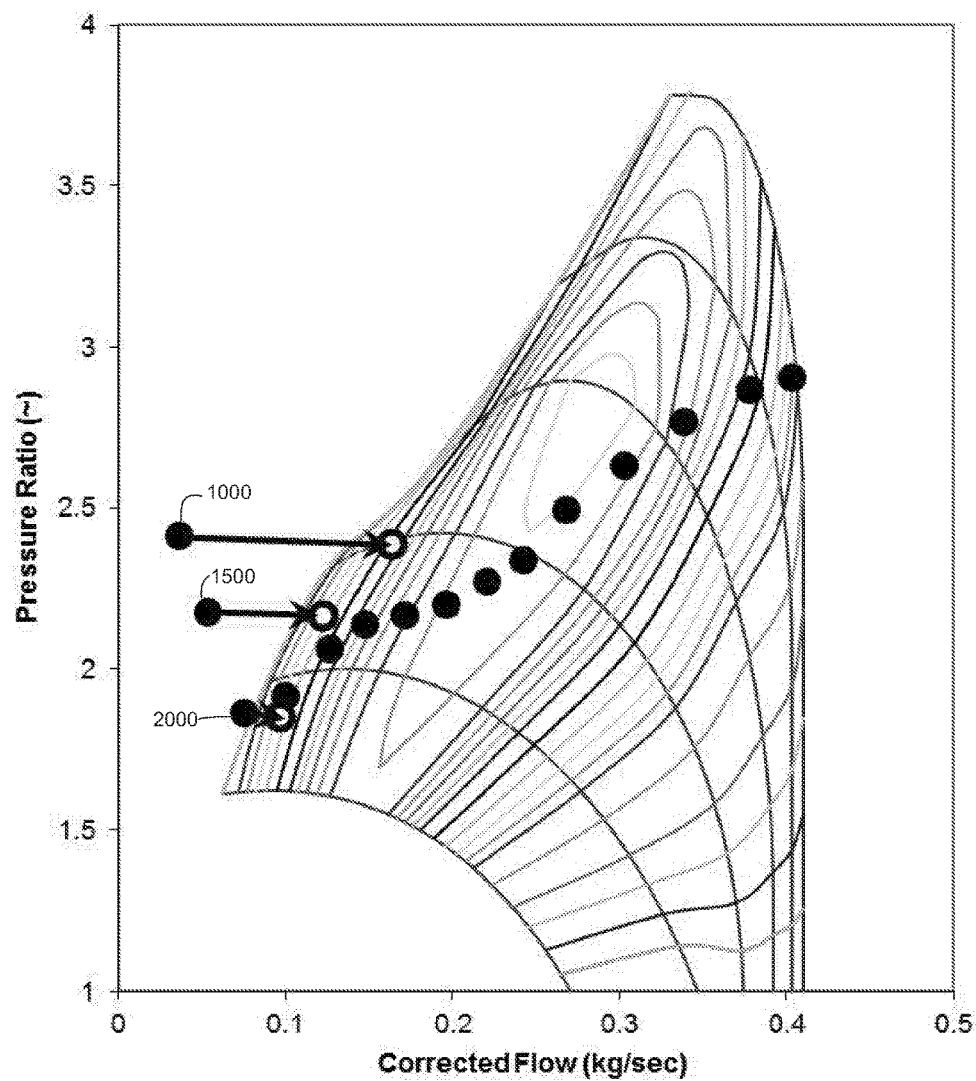
FIG. 2 is a plot of a compressor map illustrating surge line limitations imposed by the compressor map useful in a number of variations.

FIG. 2 shows when the engine is at relatively low speeds of 1,000-2,000 rpm, the 1,000-2,000 rpm points, indicted by solid black dots on the far left, are outside of the compressor map—that is, they are left of the surged line. By utilizing a compressor bleed path 26 constructed and arranged to compressor air to the exhaust conduit 14, the operating points for 1,000-2,000 RPMs can be maintained or moved to points, indicated by rings, that are inside of the surge line and may result in constant engine torque from 1,000 rpm to 8,000 rpm.

The controller 24 may be connected to the motor/generator 20 to control the operation thereof. In a number of variations, one or more sensors may be provided and associated with the motor/generator 20 or a motor connected to the compressor to detect or monitor current draw or other operating parameters of the motor/generator 20 or a motor connected to the compressor to determine if the compressor 18 is operating in a surge state or approaching a surge state. The controller 24 may include a processor and data storage components. Algorithms, look up tables, models and the like may be stored in the controller 24 to detect compressor surge. The controller 24 may use data from the sensor 25 to determine if the compressor 18 is operating in surge or if the compressor is approaching a surge state. In response to the determination that the compressor 18 is operating in surge or if the compressor is approaching a surge state the controller 24 may be used to adjust the valve 28 to allow air discharge from the compressor 18 to bleed to atmosphere or flow into the exhaust conduit 14 up stream of the turbine 16 to bring the compressor 18 into a stable state or to maintain the compressor in a stable state. If the controller 24 determines that the compressor 18 is not operating in surge nor is the compressor 18 approaching a surge state, the controller 24 may be used to adjust the valve 28 to close the same. In a number of variations, the current draw of the motor/generator monitor 20, or a motor connected to the compressor, over a period of time and analyzed by the controller 24 to determine if there are repeating peaks or spikes in current draw indicative that the turbocharger is operating in surge. In a number of variations, one or more sensors 27, 29 may be located in the system for example, but not limited to, in the air intake conduit 22 at or near the outlet of the compressor 18 or in a combustion chamber 31 of the engine 12. In a number of variations, sensors 27, 29 may sense any of a variety of parameters indicative of compressor surge or that may be used to determine or predict that the compressor is in surge or that the compressor is approaching a surge state within predetermine range. In a number of variations, sensor 27, 29 may sense pressure, sound, or vibration. In a number of variations, the sensors 27, 29 may be virtual sensors using models, lookup table, or algorithms to determine or estimate the speed of the motor or the current draw of the motor.

In a number of variations, the controller and sensors 27, 29 (in hardware or virtual form) may be used to determine high frequency oscillations, for example but not limited to 5-20 Hz, in the speed of the motor or in the current draw of the motor indicative of the compressor undergoing surge. In a number of variations, surge can be observed or detected by monitoring speed oscillation if controlling the motor in a speed feedback loop. In a number of variations, surge can be observed or detected by monitoring current oscillation if controlling current in a current or torque feedback loop.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product comprising: an electrically assisted turbocharger comprising a turbine operatively connected to a compressor by a shaft and an electric motor operatively connected to the compressor to assist in driving the compressor, an exhaust conduit connected to an inlet of the turbine, a bleed path connected to an outlet of the compressor, the bleed path having an end connected to the exhaust conduit up stream of the turbine constructed and arranged to flow air from the compressor into the turbine.

Variation 2 may include a product as set forth in Variation 1 further comprising a valve in the bleed path constructed and arranged to control the flow of air from the compressor through the bleed path.

Variation 3 may include a product as set forth in any of Variations 1-2 further comprising a valve in the bleed path constructed and arranged to control the flow of air through the end connected to the exhaust conduit up stream of the turbine constructed and arranged to flow air from the compressor into the turbine.

Variation 4 may include a product as set forth in any of Variations 1-3 further comprising an electric actuator operatively connected to the valve and further comprising a controller connected to the electric actuator to control the same.

Variation 5 may include a product as set forth in any of Variations 1-4 wherein the motor is a motor/generator.

Variation 6 may include a product as set forth in any of Variations 1-5 further comprising an electric generator connected to the turbine.

Variation 7 may include a product as set forth in any of Variations 1-6 further comprising a fuel injector operatively connected to the compressor bleed path to inject fuel into the bleed path, and an igniter operatively connected to the bleed path ignite the fuel in the bleed path to increase flow of gas through the turbine.

Variation 8 may include a method comprising: providing a product comprising a turbocharger comprising a turbine operatively connected to a compressor, an exhaust conduit connected to an inlet of the turbine, a bleed path connected to an outlet of the compressor, the bleed path comprising an end connected to the exhaust conduit up stream of the turbine constructed and arranged to flow air from the compressor into the turbine, a valve in the bleed path, an electric motor connected to assist rotation of the compressor, a power source connected to the electric motor to drive the same, a controller connected to the valve to control the movement of the valve, the controller connected to the electric motor to control the same, a sensor constructed and arranged to sense the operation of the compressor, the controller constructed and arranged to receive data from the sensor and determine if the compressor is operating in surge or if the compressor is approaching a surge state; supplying power from the power source to the motor drive the same and rotate the compressor; using the sensor and the controller to determine at least one of: if the compressor is operating in surge or if the compressor is approaching a surge state within a predetermined range; in response to the determination if the compressor is operating in surge or if the compressor is approaching a surge state within a predetermined range, adjusting the valve to control the flow of air in the bleed path.

Variation 9 may include a method as set forth in Variation 8 wherein the adjusting the valve to control the flow of air in the bleed path comprises opening the valve if the determination is that the compressor is operating in surge or if the compressor is approaching a surge state within a predetermined range.

Variation 10 may include a method as set forth in any of Variations 8-9 wherein the adjusting the valve to control the flow of air in the bleed path comprises opening the valve if the determination is that the compressor is operating in surge.

Variation 11 may include a method as set forth in any of Variations 8-10 wherein using the sensor and the controller comprises using the sensor and the controller to determine if the compressor is operating in surge.

Variation 12 may include a method as set forth in any of Variations 8-11 wherein using the sensor and the controller to determine if the compressor is operating in surge comprises monitoring the current draw of the motor over time and determining if there is a high frequency oscillation in the current draw by the electric motor indicative that the turbocharger is operating in surge.

Variation 13 may include a method as set forth in any of Variations 8-11 wherein using the sensor and the controller to determine if the compressor is operating in surge comprises monitoring the speed of the motor over time and determining if there is a high frequency oscillation in the speed of the electric motor indicative that the turbocharger is operating in surge.

Variation 14 may include a method comprising: providing a product comprising a turbocharger comprising a turbine operatively connected to a compressor, an electric motor operatively coupled to the compressor to drive the same, an exhaust conduit connected to an inlet of the turbine, a bleed path connected to an outlet of the compressor, the bleed path comprising an end connected to the exhaust conduit up stream of the turbine constructed and arranged to flow air from the compressor into the turbine, a sensor in the product constructed and arranged to sense one or more parameters indicative of compressor surge or that may be used to determine or predict that the compressor is in surge or that the compressor is approaching a surge state within predetermine range; using the sensor and the controller to determine at least one of: if the compressor is operating in surge or if the compressor is approaching a surge state within a predetermined range; in response to the determination if the compressor is operating in surge or if the compressor is approaching a surge state within a predetermined range, adjusting the flow of air in the bleed path.

Variation 15 may include a method as set forth in Variation 14 wherein the sensor is constructed and arranged to sense current draw by the electric motor or motor speed.

Variation 16 may include a method as set forth in Variation 14 wherein using the sensor and the controller to determine if the compressor is operating in surge comprises monitoring the current draw by the electric motor over time and determining if there is high frequency oscillation in current draw by the motor indicative that the turbocharger is operating in surge.

Variation 17 may include a method as set forth in Variation 14 wherein using the sensor and the controller to determine if the compressor is operating in surge comprises monitoring the speed of the electric motor over time and determining if there is a high frequency oscillation in the speed of the electric motor indicative that the turbocharger is operating in surge.

Variation 18 may include a method as set forth in Variation 14 wherein the sensor is a pressure sensor.

Variation 19 may include a method as set forth in any of Variations 14-18 wherein the product further comprises a valve in the bleed path and wherein the adjusting the flow of air in the bleed path comprises moving the valve.

Variation 20 may include a method as set forth in Variation 12 wherein the high frequency ranges between 5-20 Hz.

Variation 21 may include a method as set forth in Variation 13 wherein the high frequency ranges between 5-20 Hz.

Variation 22 may include a method as set forth in Variation 16 wherein the high frequency ranges between 5-20 Hz.

Variation 23 may include a method as set forth in Variation 17 wherein the high frequency ranges between 5-20 Hz.

The above description of select variations within the scope of the invention is merely illustrative in nature and, thus, variations or variants thereof are not to be regarded as a departure from the spirit and scope of the invention.

What is claimed is:

1. A method comprising:
   providing a product comprising a turbocharger comprising a turbine operatively connected to a compressor, an exhaust conduit connected to an inlet of the turbine, a bleed path connected to an outlet of the compressor, the bleed path comprising an end connected to the exhaust conduit up stream of the turbine constructed and arranged to flow air from the compressor into the turbine, a valve in the bleed path, an electric motor connected to assist rotation of the compressor, a power source connected to the electric motor to drive the same, a controller connected to the valve to control the movement of the valve, the controller connected to the electric motor to control the same, a sensor constructed and arranged to sense at least one of pressure, sound, or vibration of the compressor, the controller constructed and arranged to receive data from the sensor and determine if the compressor is operating in surge or if the compressor is approaching a surge state;
   supplying power from the power source to the motor drive the same and rotate the compressor;
   using the sensor and the controller to determine at least one of: if the compressor is operating in surge or if the compressor is approaching a surge state within a predetermined range;
   in response to the determination if the compressor is operating in surge or if the compressor is approaching a surge state within a predetermined range, adjusting the valve to control the flow of air in the bleed path;
   wherein using the sensor and the controller to determine if the compressor is operating in surge comprises monitoring at least one of pressure, sound, or vibration of the compressor over time and determining if there is a high frequency oscillation in current draw by the electric motor indicative that the turbocharger is operating in surge; and
   wherein the adjusting the valve to control the flow of air in the bleed path comprises opening the valve upon the determination that the compressor is operating in surge.

2. A method as set forth in claim 1 wherein the adjusting the valve to control the flow of air in the bleed path comprises opening the valve if the determination is that the compressor is operating in surge or if the compressor is approaching a surge state within a predetermined range.

3. A method as set forth in claim 1 wherein the high frequency ranges between 5-20 Hz.

4. A method comprising:
providing a product comprising a turbocharger comprising a turbine operatively connected to a compressor, an electric motor operatively coupled to the compressor to drive the same, an exhaust conduit connected to an inlet of the turbine, a bleed path connected to an outlet of the compressor, the bleed path comprising an end connected to the exhaust conduit up stream of the turbine constructed and arranged to flow air from the compressor into the turbine, a sensor in the product constructed and arranged to sense at least one of pressure, sound, or vibration indicative of compressor surge or that is constructed and arranged to determine or predict that the compressor is in surge or that the compressor is approaching a surge state within a predetermine range;
using a controller to determine at least one of: if the compressor is operating in surge or if the compressor is approaching a surge state within a predetermined range;
in response to the determination if the compressor is operating in surge or if the compressor is approaching a surge state within a predetermined range, adjusting the flow of air in the bleed path;
wherein the product further comprises an electric motor connected to the compressor to drive the same, and wherein using the controller to determine if the compressor is operating in surge comprises monitoring at least one of pressure, sound, or vibration of the compressor over time and determining if there is a high frequency oscillation in current draw by the electric motor indicative that the turbocharger is operating in surge; and
wherein the product further comprises a valve in the bleed path and wherein the adjusting the flow of air in the bleed path comprises moving the valve upon the determination that the compressor is operating in surge.

5. A method as set forth in claim 4 wherein the sensor is constructed and arranged to sense current draw by the electric motor or electric motor speed.

6. A method as set forth in claim 4 wherein the sensor is a pressure sensor.

7. A method as set forth in claim 4 wherein the high frequency ranges between 5-20 Hz.

* * * * *